(12) United States Patent
Trautenberg

(10) Patent No.: US 8,198,989 B2
(45) Date of Patent: Jun. 12, 2012

(54) METHOD AND APPARATUS FOR INFORMING A USER OF THE POSITION OF AN INFORMATION SOURCE RELATIVE TO THE USER POSITION

(75) Inventor: Hans L. Trautenberg, Ottobrunn (DE)

(73) Assignee: Astrium GmbH, Taufkirchen (DE)

( * ) Notice: Subject to any disclaimer, the term of this patent is extended or adjusted under 35 U.S.C. 154(b) by 373 days.

(21) Appl. No.: 12/506,048

(22) Filed: Jul. 20, 2009

(65) Prior Publication Data

US 2010/0013611 A1 Jan. 21, 2010

(30) Foreign Application Priority Data

Jul. 21, 2008 (DE) .......................... 10 2008 034 200

(51) Int. Cl.
*H04B 3/36* (2006.01)
(52) U.S. Cl. .... 340/407.1; 340/506; 340/3.1; 340/573.1
(58) Field of Classification Search ................. 340/506, 340/407.1, 3.1, 573.1
See application file for complete search history.

(56) References Cited

U.S. PATENT DOCUMENTS

| 6,326,901 | B1 | 12/2001 | Gonzales |
| 6,608,559 | B1 * | 8/2003 | Lemelson et al. ....... 340/539.13 |
| 2007/0168114 | A1 | 7/2007 | Tillotson |

FOREIGN PATENT DOCUMENTS

| DE | 102 42 903 A1 | 3/2004 |
| DE | 10 2005 032 386 A1 | 1/2007 |

* cited by examiner

*Primary Examiner* — Daryl Pope
(74) *Attorney, Agent, or Firm* — Crowell & Moring LLP

(57) ABSTRACT

In a process for informing a user regarding the position of an information source relative to the user's position, the position of an information source is first determined relative to the user. Thereafter, a tactile or electrical stimulus is generated, for directly affecting the user in a location that corresponds to the determined position of the information source. In one embodiment of the invention, tactile or electrical actuators are disposed at locations within a garment, such as a pilot's uniform at locations which correspond to possible locations of the information source.

10 Claims, 2 Drawing Sheets

METHOD AND APPARATUS FOR INFORMING A USER OF THE POSITION OF AN INFORMATION SOURCE RELATIVE TO THE USER POSITION

This application claims the priority of German patent document 10 2008 034. 200.9, filed Jul. 21, 2008, the disclosure of which is expressly incorporated by reference herein.

The invention relates to a method and apparatus for informing a user regarding the location of an information source, relative to the user's own position.

In situation warning and situation awareness systems, an audio signal is frequently used to supply information to the user concerning the position of a danger source relative to the user position. An example of the application of such systems is the warning of a pilot regarding sources of danger, such as flying objects approaching his airplane.

Published U.S. Patent Application No. 2007/0168114 A1 describes a communication system which makes it possible for a user to perceive the relative spatial position of objects. For this purpose, the system generates synthetic tone information which represents the relative position of an object. This system is suitable, for example, for determining the position of a speaker participating in an audio conference or the position of a remote-controlled flying object that is situated in the landing approach. By a modification of the tone information, the direction from which a communication, information or warning is coming can be identified.

One object of the present invention, therefore, is to provide an improved method and apparatus for informing a user concerning the position of an information source relative to the user position.

This and other objects and advantages are achieved by the method and apparatus according to the invention, in which tactile and/or electrical stimuli are applied to a user to provide information on the position of an information source, such as an approaching flying object. Such stimuli are more suitable than sounds for determining the position of the information source because they have a direct effect on the user's body and are therefore less susceptible to interferences than sound signals.

An embodiment of the invention provides a process for informing a user concerning the position of an information source with respect to the user position, the process having the following steps: Determining the position of an information source with respect to the user position and generating tactile and/or electrical stimuli for directly affecting the user in a position corresponding to the determined position of the information source. As a result, for example, a pilot can be warned in a safe and reliable manner concerning the position of an object approaching him because, in contrast to acoustic signals, the tactile and electrical stimuli affect the pilot directly and are therefore less susceptible to interferences. In addition, the user can better differentiate the position of an information source signaled in this manner from, for example, other signaled information sources.

According to a further embodiment of the invention, the electrical stimuli may comprise the control signals for actuators for directly affecting the user, which are transmitted to the actuators that are typically situated directly on the user's body. For example, they may be worked into a garment, such as a pilot's uniform, so that stimuli can directly affect the user in a manner that is as noticeable as possible.

According to an embodiment of the invention, the actuators may include tactile and/or electrical actuators. For example, electrodes may be provided as actuators by which an electric current is conducted that can be perceived by the user, but is naturally not harmful. Likewise, mechanical actuators can be used for generating tactile stimuli, such as small electromagnetically controlled actuators which can be activated by way of electric signals. The tactile actuators may include pressure- or vibration-generating actuators. Likewise, contact actuators can be used (i.e., actuators which come in contact with the user's skin when they are activated). It is important that the tactile actuators can stimulate mechanicoreceptors in the user's skin.

According to another embodiment of the invention, the generation of tactile and/or electrical stimuli for the direct effect on the user also comprises adjusting the intensity of the stimuli as a function of parameters of the information source. As a result, additional information concerning the position can be transmitted to the users.

A parameter of the information source may principally be one of the following: The distance of the information source from the user; the degree of danger posed to the user by the information source; the speed of the information source; the movement direction of the information source. For example, in the event of a short distance from the information source, a high intensity of the generated stimuli can signal to the user that danger is possibly imminent, for example, in air traffic when an airplane is approached by another airplane and is only a short distance away from the airplane.

A further embodiment of the invention provides a system for informing a user concerning the position of an information source with respect to the user position, the system including a device for determining the position of an information source with respect to the user position, and a device for generating tactile and/or electrical stimuli for directly affecting the user in a position corresponding to the determined position of the information source. This device may be constructed, for example, as a portable apparatus, which can be used by a vehicle operator in a vehicle, particularly carried along by a pilot in an airplane, and can be used as an additional warning device.

According to an embodiment of the invention, the devices for generating tactile and/or electrical stimuli may comprise devices that generate control signals for actuators for directly affecting the user, and transmit the generated control signals to the actuators.

According to a further embodiment of the invention, the actuator may be a tactical and/or electrical actuator.

Furthermore, in an embodiment of the invention, the devices for generating tactile and/or electrical stimuli for directly affecting the user may be constructed such that they can adjust the intensity of the stimuli as a function of parameters of the information source.

According to an embodiment of the invention, a parameter of the information source may be one of the following: The distance of the information source from the user; the degree of danger to the user caused by the information source; the speed of the information source; the movement direction of the information source.

Finally, an embodiment of the invention relates to a garment for a user, particularly a pilot's uniform with tactile and/or electrical actuators, which is constructed for the operation by means of a device according to the invention and as described above. The garment may, for example, have a connection interface, by which control signals are transmitted for actuators present in the garment.

Other objects, advantages and novel features of the present invention will become apparent from the following detailed description of the invention when considered in conjunction with the accompanying drawings.

BRIEF DESCRIPTION OF THE DRAWINGS

The terms and assigned reference symbols used in the attached list of reference symbols are used in the description, in the claims, in the abstract and in the drawings.

DETAILED DESCRIPTION OF THE DRAWINGS

In the following, identical and/or functionally identical elements may be provided with the same reference symbols.

Figure 1:
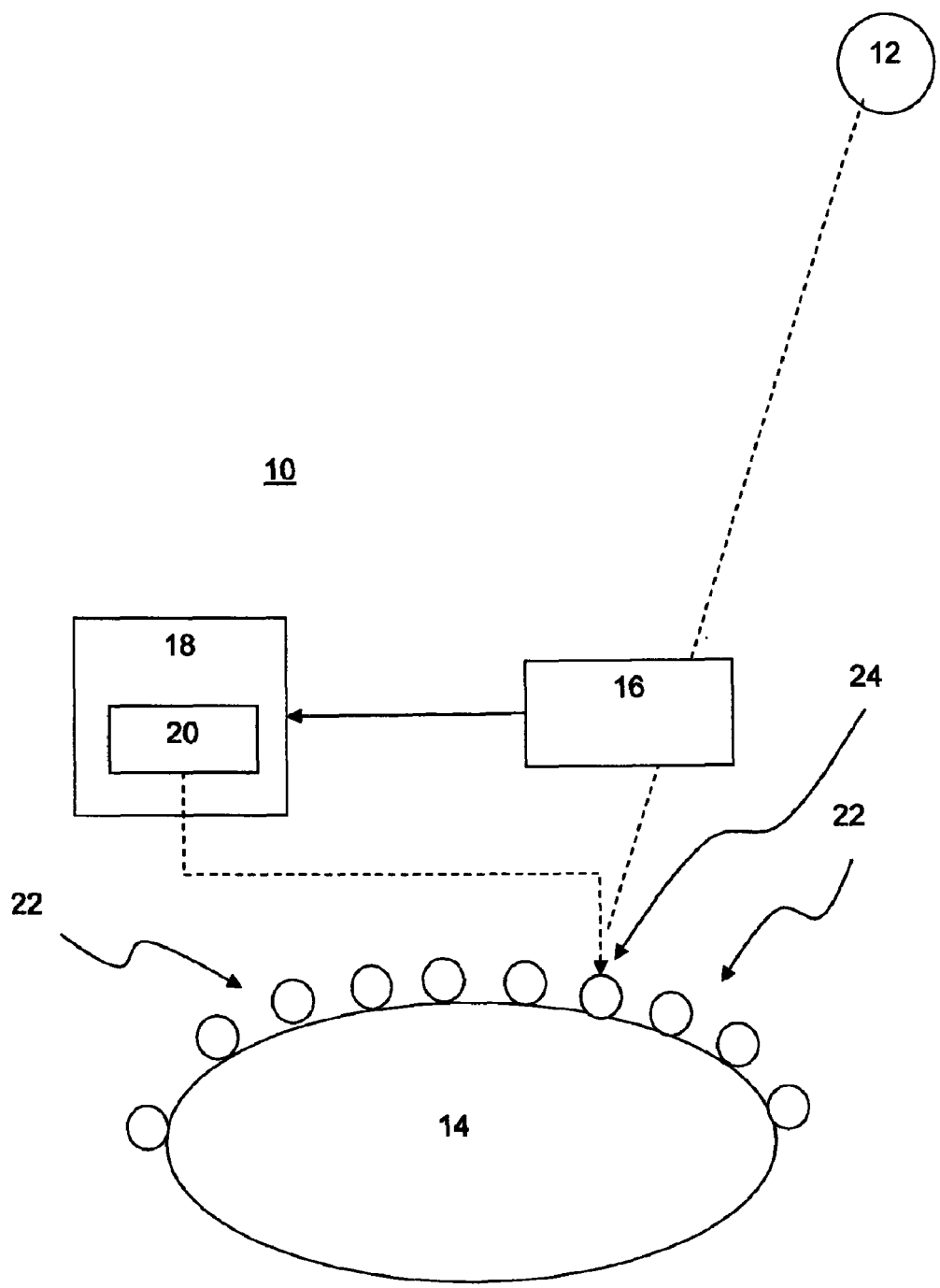
FIG. 1 is a view of an embodiment of a system for informing a user concerning the position of an information source with respect to the user position according to the invention.

FIG. 1 shows a user 14 (for example, a pilot), and an object 12 as the information source which is situated approximately in a position between 1 and 2 o'clock relative to the position of the user 14. The user 14 has actuators 22, such as electrodes and/or small vibrators, on his body. In addition to the actuators 22, the system 10 according to the invention illustrated in FIG. 2 has devices 16 for determining the position of the information source 12 relative to the user position 14, such as a camera with an image processor which evaluates the camera images with respect to objects and their position relative to the camera position. In this case, it is assumed that the position of the devices 16 corresponds approximately to the user's position 14, so that the position of the object 12 determined by means of the devices 16 reflects approximately the position also determined by the user.

Furthermore, devices 18 are provided for generating tactile and/or electrical stimuli for directly affecting the user. The devices 18 process the evaluation data supplied by the devices 16 concerning the position of the object 12 with respect to the user position 14 such that they determine the position 24 of the effect of electrical and/or tactile stimuli in order to draw the user's attention to the position of the object 12. For this purpose, they convert the transmitted position of the object 12 to corresponding position data.

The devices 18 also comprise additional devices 20 for generating control signals for the determined actuators 22. From the position data 24, these devices 20 generate activation signals for the actuator or actuators 22, which are situated in position 24 of the effect of electrical and/or tactile stimuli determined by the devices 18 and therefore address the corresponding actuators 22.

Although the devices 16, 18 and 22 are illustrated as separate units in FIG. 1, they may be combined in one unit, for example, in an object position recognition and actuator control unit in the form of a computer, which carries out the algorithm illustrated in FIG. 2 and described in the following. Such a unit can then transmit the activation signals for the actuators 22 on the user's body by way of an appropriate wire-bound or wireless interface.

Figure 2:
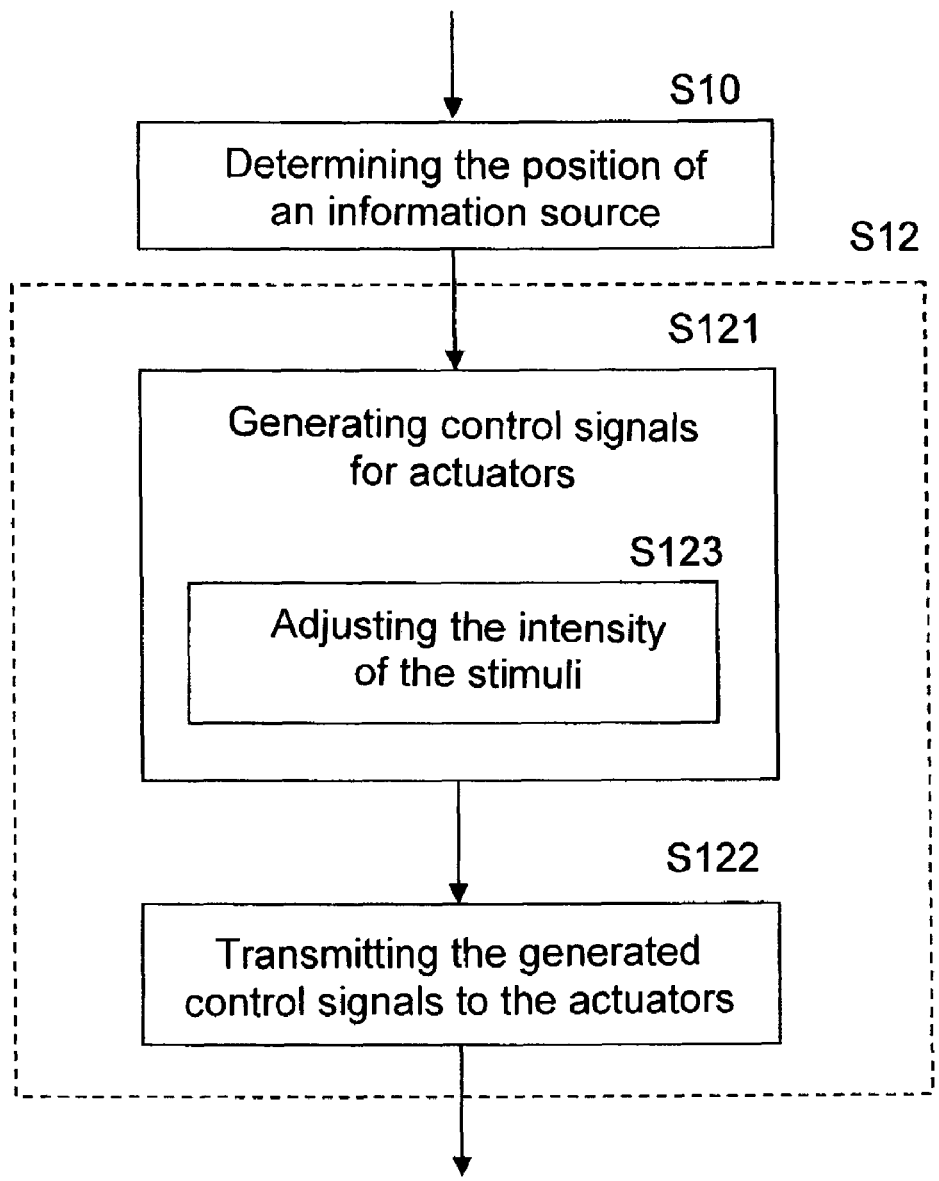
FIG. 2 is a flow chart of an embodiment of a process according to the invention for informing a user concerning the position of an information source relative to the user's position.

FIG. 2 illustrates the sequence of the process according to the invention for informing the user 14 concerning the position of the object 12 relative to the user position, which may, for example be implemented in the system of FIG. 1 which has a processor appropriate for the implementation. The process illustrated in FIG. 2 essentially has the following steps: First, in Step S10, the position of an information source—in FIG. 1, of the object 12 relative to the user position—is determined. As mentioned above, this may take place by the evaluation of camera images or by way of a suitable sensor system. Subsequently, in Step S12, tactile and/or electrical stimuli are generated, for direct application to the user in a position 24 corresponding to the determined position of the information source. This Step S12 is divided into the following substeps: First control signals for actuators are generated in a Step S121 for directly affecting the user. This comprises determination of the determined position 24 of the effect of electrical and/or tactile stimuli on the body of the user 14; addressing the actuators 22 in the determined position 24; and finally the generating of control signals for the determined actuators 22. In the subsequent Step S122, the control signals thus generated will then be transmitted to the actuators.

Additional information can be transmitted to the user 14 by varying the intensity of the stimulus, particularly information concerning a possible danger caused by the object 12. For this purpose, a Step S123 is provided in which the intensity of the stimuli is adjusted as a function of parameters of the information source. For example, the determined distance or the approaching speed of the object 12 can be evaluated for varying the intensity of the stimulus. In particular, the intensity of the stimulus can be increased when the distance to the object 12 is short.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Reference Symbols
10 System for informing a user concerning the position of an information source 12 with respect to the user position 14
12 Information source or object
14 User or user position
16 Device for determining the position of the information source 12 with respect to the user position 14
18 Device for generating tactile and/or electrical stimuli for directly affecting the user
20 Device for generating control signals for actuators
22 Actuators
24 Position of the effect of electrical and/or tactile stimuli
S10-S12 Process steps

What is claimed is:

1. A process for informing a user concerning the position of an information source relative to the user's own position, said process comprising:
    determining the position of an information source relative to the user's position;
    determining a location on a body of the user corresponding to the determined position of the information source;
    selecting one or more actuators from a plurality of actuators in different positions on the user's body using the determined location on the user's body; and
    generating using the selected one or more actuators, one of tactile and electrical stimuli for direct application to the user in the location on the user's body corresponding to the determined position of the information source.

2. The process according to claim 1, wherein generating tactile or electrical stimuli comprises:
    generating control signals for the selected one or more actuators for directly affecting the user; and
    transmitting the generated control signals to the selected one or more actuators.

3. The process according to claim 2, wherein the plurality of actuators include at least one of tactile and electrical actuators.

4. The process according to claim 1, wherein generating tactile or electrical stimuli for directly affecting the user further comprises adjusting the intensity of the stimuli as a function of parameters of the information source.

5. The process according to claim 4, wherein a parameter of the information source is one of a distance to the information source from the user, a degree of danger to the user caused by the information source, speed of the information source, and a movement direction of the information source.

6. A system for informing a user concerning the position of an information source relative to the user position, said system comprising:
- a device for determining the position of an information source with respect to the user position;
- a transmitter which generates tactile or electrical stimuli for directly affecting the user; and
- a tactile or electric stimulator arrangement comprising a plurality of actuators, wherein the transmitter is configured to generate tactile or electrical stimuli using selected ones of the plurality of actuators for stimulating the user in a location on the user's body corresponding to the determined position of the information source.

7. The system according to claim 6, wherein the actuators include tactile and/or electrical actuators.

8. The system according to claim 6, wherein the devices for generating tactile and/or electrical stimuli for directly affecting the user are also constructed such that they can adjust the intensity of the stimuli as function of parameters of the information source.

9. The system according to claim 8, wherein a parameter of the information source comprises one of a distance of the information source from the user, a degree of danger to the user caused by the information source, a speed of the information source, and a movement direction of the information source.

10. The system according to claim 6, wherein the plurality of actuators are integrated in a pilot's uniform.

* * * * *